(12) United States Patent
Sillanpaa

(10) Patent No.: US 12,232,212 B2
(45) Date of Patent: Feb. 18, 2025

(54) EMERGENCY OPERATIONS SLICE EXCHANGE BETWEEN ENTITIES IN MOBILE NETWORKS

(71) Applicant: NOKIA SOLUTIONS AND NETWORKS OY, Espoo (FI)

(72) Inventor: Anna Sillanpaa, Jarvenpaa (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 20 days.

(21) Appl. No.: 17/187,123

(22) Filed: Feb. 26, 2021

(65) Prior Publication Data

US 2022/0279621 A1 Sep. 1, 2022

(51) Int. Cl.
*H04W 4/90* (2018.01)
*H04W 48/18* (2009.01)
*H04W 76/11* (2018.01)
*H04W 76/50* (2018.01)

(52) U.S. Cl.
CPC ............ *H04W 76/50* (2018.02); *H04W 4/90* (2018.02); *H04W 48/18* (2013.01); *H04W 76/11* (2018.02)

(58) Field of Classification Search
CPC ....... H04W 4/23; H04W 4/026; H04W 4/027; H04W 4/029; H04W 4/90; H04W 24/10; H04W 48/11; H04W 48/16; H04W 60/00; H04W 76/10; H04W 76/11; H04W 76/50
USPC ........................................................ 370/329
See application file for complete search history.

(56) References Cited

U.S. PATENT DOCUMENTS

| | | | |
|---|---|---|---|
| 10,347,145 B1 * | 7/2019 | Braunberger | H04H 60/65 |
| 11,218,416 B1 * | 1/2022 | Yang | H04L 47/624 |
| 11,696,113 B2 * | 7/2023 | Ianev | H04W 28/0215 370/329 |
| 2018/0288582 A1 * | 10/2018 | Buckley | H04W 12/06 |
| 2018/0324877 A1 * | 11/2018 | Tiwari | H04L 63/108 |
| 2019/0289470 A1 * | 9/2019 | Vaidya | H04W 16/14 |
| 2020/0053361 A1 * | 2/2020 | Robert | H04N 19/573 |
| 2020/0053619 A1 * | 2/2020 | Sartori | H04W 36/30 |
| 2020/0077327 A1 * | 3/2020 | Duan | H04W 76/11 |
| 2020/0205065 A1 * | 6/2020 | Wei | H04W 48/16 |
| 2020/0252847 A1 * | 8/2020 | Park | H04W 80/02 |
| 2020/0267554 A1 * | 8/2020 | Faccin | H04L 63/101 |
| 2020/0314701 A1 * | 10/2020 | Talebi Fard | H04W 36/0016 |
| 2021/0036919 A1 * | 2/2021 | Foti | H04L 41/0806 |

(Continued)

OTHER PUBLICATIONS

3GPP TS 23.501 V15.12.0 (Dec. 2020), Technical Specification, 3rd Generation Partnership Project; Technical Specification Group Services and System Aspects; System architecture for the 5G System (5GS); Stage 2 (Release 15), Dec. 2020.

(Continued)

*Primary Examiner* — Jean A Gelin
(74) *Attorney, Agent, or Firm* — SQUIRE PATTON BOGGS (US) LLP

(57) ABSTRACT

Certain example embodiments provide systems, methods, apparatuses, and computer program products for emergency operations (e.g., Internet protocol multimedia subsystem (IMS) emergency calls) network slice exchange between entities in mobile networks. For example, a network node (e.g., a core network node, such as an access and mobility management function (AMF)) may provide, to a radio access network (RAN) node, information that identifies network slice(s) to be used for emergency operation(s).

20 Claims, 7 Drawing Sheets

(56) References Cited

U.S. PATENT DOCUMENTS

| | | | |
|---|---|---|---|
| 2021/0105652 A1* | 4/2021 | Jeong | H04M 15/8016 |
| 2021/0337461 A1* | 10/2021 | Yang | H04W 88/10 |
| 2021/0337553 A1* | 10/2021 | Chong | H04W 24/02 |
| 2021/0377847 A1* | 12/2021 | Yang | H04W 48/16 |
| 2022/0007277 A1* | 1/2022 | Yu | H04W 60/00 |
| 2022/0030407 A1* | 1/2022 | Bercovici | H04W 24/02 |
| 2022/0141630 A1* | 5/2022 | Agarwal | H04W 4/24 |
| | | | 455/406 |
| 2022/0150783 A1* | 5/2022 | Jin | H04W 36/125 |
| 2022/0217625 A1* | 7/2022 | Zhu | H04W 36/13 |
| 2022/0272531 A1* | 8/2022 | Ianev | H04W 12/088 |
| 2022/0286951 A1* | 9/2022 | Futaki | H04W 48/18 |
| 2022/0369204 A1* | 11/2022 | Jeong | H04W 48/18 |
| 2023/0054288 A1* | 2/2023 | Gao | H04W 36/08 |
| 2023/0108950 A1* | 4/2023 | Centonza | H04W 36/0072 |
| | | | 370/331 |
| 2023/0156583 A1* | 5/2023 | Murray | H04W 48/20 |
| | | | 370/329 |
| 2023/0209453 A1* | 6/2023 | Basu | H04W 48/18 |
| | | | 370/328 |
| 2023/0388908 A1* | 11/2023 | Wang | H04W 48/14 |

OTHER PUBLICATIONS

3GPP TS 23.501 V16.7.0 (Dec. 2020), Technical Specification, 3rd Generation Partnership Project; Technical Specification Group Services and System Aspects; System architecture for the 5G System (5GS); Stage 2 (Release 16), Dec. 2020.

3GPP TS 23.502 V15.12.0 (Dec. 2020), Technical Specification, 3rd Generation Partnership Project; Technical Specification Group Services and System Aspects; Procedures for the 5G System (5GS); Stage 2 (Release 15), Dec. 2020.

3GPP TS 23.502 V16.7.1 (Jan. 2021), Technical Specification, 3rd Generation Partnership Project; Technical Specification Group Services and System Aspects; Procedures for the 5G System (5GS); Stage 2 (Release 16), Jan. 2021.

3GPP TS 38.413 V15.10.0 (Jan. 2021), Technical Specification, 3rd Generation Partnership Project; Technical Specification Group Radio Access Network; NG-RAN; NG Application Protocol (NGAP) (Release 15), Jan. 2021.

3GPP TS 38.413 V16.4.0 (Jan. 2021), Technical Specification, 3rd Generation Partnership Project; Technical Specification Group Radio Access Network; NG-RAN; NG Application Protocol (NGAP) (Release 16), Jan. 2021.

3GPP TS 38.423 V15.10.0 (Jan. 2021), Technical Specification, 3rd Generation Partnership Project; Technical Specification Group Radio Access Network; NG-RAN; Xn application protocol (XnAP) (Release 15), Jan. 2021.

3GPP TS 38.423 V16.4.0 (Jan. 2021), Technical Specification, 3rd Generation Partnership Project; Technical Specification Group Radio Access Network; NG-RAN; Xn application protocol (XnAP) (Release 16), Jan. 2021.

* cited by examiner

EMERGENCY OPERATIONS SLICE EXCHANGE BETWEEN ENTITIES IN MOBILE NETWORKS

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for emergency operations (e.g., Internet protocol multimedia subsystem (IMS) emergency calls) network slice exchange between entities in mobile networks.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include transmitting information identifying at least one network slice. The at least one network slice may be used for one or more emergency operations. In a variant, the transmitting may include transmitting the information in at least one of: a next generation setup response, a downlink non-access stratum transport message, a F1 setup response, an E1 setup response, a Xn setup response, or user equipment-related signaling. In a variant, the transmitting may include transmitting the information to a core network, or transmitting the information to a radio access network node. In a variant, the radio access network node may include at least one of a network node, a central unit of the network node, a control plane of the central unit of the network node, a user plane of the central unit of the network node, or a distributed unit of the network node.

In a variant, the transmitting may include transmitting the information in a message associated with at least one of: a next generation application protocol setup procedure, a X1 application protocol setup procedure, a F1 application protocol setup procedure, an E1 application protocol setup procedure, a downlink non-access stratum transport procedure, a handover procedure over an interface, or a user equipment-related procedure. In a variant, the information may include network slice selection assistance information or a network slice instance identifier. In a variant, the one or more emergency operations may include at least an emergency call. In a variant, the method may further include transmitting, in association with transmitting the information, public land mobile network information or tracking area information. In a variant, the method may further include receiving information identifying one or more network slices supported by a radio access network node prior to transmitting the information identifying the at least one network slice. In a variant, the at least one network slice may be included in the one or more network slices.

According to a second embodiment, a method may include receiving information identifying at least one network slice. The at least one network slice may be used for one or more emergency operations. In a variant, the receiving may include receiving the information in at least one of: a next generation setup response, a downlink non-access stratum transport message, a F1 setup response, an E1 setup response, a Xn setup response, or user equipment-related signaling. In a variant, the apparatus may include at least one of: a network node, a central unit of the network node, a control plane of the central unit of the network node, a user plane of the central unit of the network node, a distributed unit of the network node, or a core network node.

In a variant, the receiving may include receiving the information in a message associated with at least one of: a next generation application protocol setup procedure, a X1 application protocol setup procedure, a F1 application protocol setup procedure, an E1 application protocol setup procedure, a downlink non-access stratum transport procedure, a handover procedure over an interface, or a user equipment-related procedure. In a variant, the information may include network slice selection assistance information or a network slice instance identifier. In a variant, the one or more emergency operations may include at least an emergency call. In a variant, the method may include receiving, in association with receiving the information, public land mobile network information or tracking area information. In a variant, the method may further include transmitting information identifying one or more network slices supported by a radio access network node prior to receiving the information identifying the at least one network slice. In a variant, the at least one network slice may be included in the one or more network slices.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to cause the apparatus to perform the method according to the first embodiment or the second embodiment, or any of the variants discussed above.

A fifth embodiment may be directed to an apparatus that may include means for performing the method according to the first embodiment or the second embodiment, or any of the variants discussed above. Examples of the means may include one or more processors, memory, and/or computer program codes for causing the performance of the operation.

A sixth embodiment may be directed to a computer readable medium comprising program instructions stored thereon for causing an apparatus to perform at least the method according to the first embodiment or the second embodiment, or any of the variants discussed above.

A seventh embodiment may be directed to a computer program product encoding instructions for causing an apparatus to perform at least the method according to the first embodiment or the second embodiment, or any of the variants discussed above.

BRIEF DESCRIPTION OF THE DRAWINGS

For proper understanding of example embodiments, reference should be made to the accompanying drawings, wherein.

DETAILED DESCRIPTION

Figure 1:
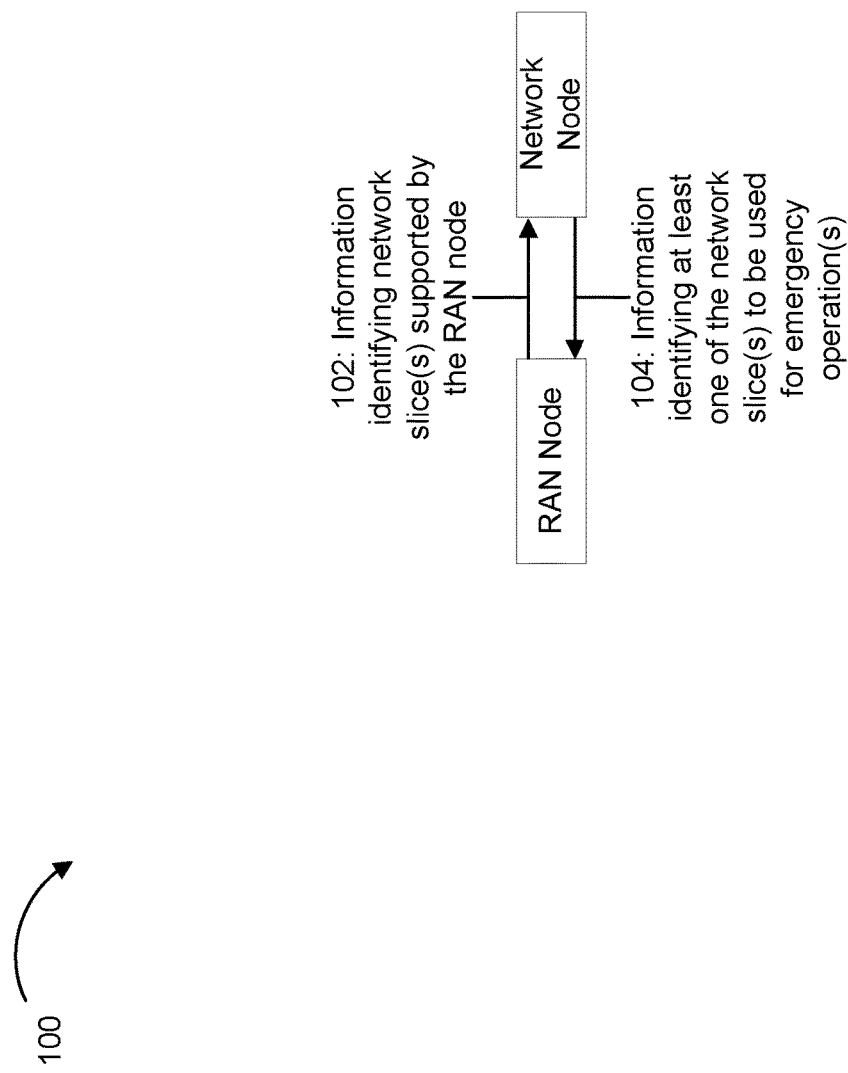
FIG. 1 illustrates an example of emergency operations network slice exchange between entities in mobile networks, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for emergency operations (e.g., IMS emergency call operations) network slice exchange between entities in mobile networks, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

NR may support IMS emergency call and network slicing. A protocol data unit (PDU) session may have an associated network slice, which may be identified by single network slice selection assistance information (S-NSSAI). In a 5G radio access network (RAN), the IMS emergency call may be identified by an allocation and retention priority (ARP) level value having a value between, e.g., 1 and 8. The exact value(s) used per 5G RAN may be operator configurable. The lower ARP level values, e.g., 9 to 15, may be reserved for non-emergency purposes. In the 5G system, a network slice may have a validity area that may be defined in terms of a registration area (RA), which may include a number of a tracking areas (TAs). The TAs may be visible to the 5G RAN and they may allow and/or restrict the use of network slices on a TA basis in the 5G RAN.

The network slice used for IMS emergency calls may be operator configurable in the core network. The core network IMS emergency call network slice configuration may not be directly visible to the 5G RAN (or a UE). At the same time, the 5G RAN may be expected to support the network slice for IMS emergency services when it is associated with the UE's IMS emergency call. In addition, NR might not specify if the network slice used for IMS emergency calls has to be included in the next generation application protocol (NGAP) setup procedure (or an access and mobility management function (AMF) and/or RAN configuration update), where the core and RAN-supported network slice information may be exchanged on a per-public land mobile network (PLMN) and/or a per-TA basis, if the network slice has to be included in UE's allowed network slices when the UE establishes a radio resource control (RRC) connection, and/or the UE's allowed network slices are provided from the core network to the RAN. With this, NR may imply, from the 5G RAN point of view, that any network slice used for an IMS emergency call may have to be supported for IMS emergency calls in any cell in NR. This may conflict with 5G RAN network slicing functionality, which may allow specific network slices in the TAs where they are defined.

In addition, the IMS emergency call may have to be supported in cells and TAs that do not support IMS emergency calls. This may result in a difficult implementation in the 5G RAN, may cause conflict with the operator's 5G RAN cell and other configurations, and may result in many exceptional situations which might hamper the success of IMS emergency calls (particularly in multi-vendor situations with more than one 5G RAN vendor). The multi-vendor challenges may impact handover procedure between the core and RAN networks (e.g., NGAP interface but also handovers over the Xn application protocol (XNAP) interface, and inter-vendor F1 and E1 interfaces).

As a result, there may be a need to address these situations in NR, as these situations may cause errors to occur in setting up and maintaining IMS emergency calls. For example, the mismatch of the network slice used by the 5G core network for the IMS emergency call and the 5G RAN network slice and feature configurations may cause IMS emergency call failures in setup, modification, and/or handover procedures. This may occur particularly between the 5G core network and the RAN, such as for procedures over the NGAP (e.g., for the UE's PDU session management procedures, such as for setup and handovers). Additionally, or alternatively, this may particularly occur between 5G gNBs, such as for procedures over Xn, NGAP, F1, and E1 interfaces, such as for the UE's PDU session management procedures related to setup, modification, and handovers.

Some embodiments described herein may provide for emergency operations (e.g., IMS emergency call) network slice exchange between entities in mobile networks. For example, a network node (e.g., a core network node, such as an AMF) may provide, to a RAN node, information that identifies network slice(s) to be used for emergency operation(s) (e.g., the IMS emergency call). The network slice(s) to be used for the emergency operation(s) may be supported by the RAN node. In this way, certain embodiments described herein may, e.g., reduce or eliminate errors in a network that would otherwise occur as a result of a mismatch between a network slice used by the core network to perform emergency operations and the network slices supported by the RAN. This may conserve processing resources of network nodes and/or network resources (e.g., bandwidth) of the core network and/or the RAN that would otherwise be wasted due to those errors. In addition, this may reduce or eliminate interruptions to services proved by a network related to emergency operations and/or may provide for network support of emergency operations in situations when those operations would otherwise not be available.

FIG. 1 illustrates an example 100 of emergency operations network slice exchange between entities in mobile networks, according to some embodiments. As illustrated in FIG. 1, the example 100 includes a RAN node (e.g., a NG-RAN node) and a network node. The RAN node may include, e.g., a gNB, a gNB central unit (gNB CU), a gNB CU-control plane (gNB CU-CP), a gNB CU-user plane (gNB CU-UP), a gNB distributed unit (gNB DU), and/or the like. The network node may include another RAN node, an AMF, an operational and maintenance (O&M) node, an operations, administration, and maintenance (OAM) node, and/or the like. In certain embodiments, the network node may be included in a core network.

As illustrated at 102, the RAN node may transmit, and the network node may receive, information identifying network slice(s) supported by the RAN node. For example, this information may identify network slice(s) that the RAN node is configured to provide or use. In certain embodiments, this may include a TA identifier (TAI) slice support list, allowed NSSAI, and/or the like.

As illustrated at 104, the network node may transmit, and the RAN node may receive, information identifying at least one of the network slice(s) to be used for emergency operation(s). For example, the information may identify a subset of the network slice(s) supported by the RAN node that can be used for emergency calls. In certain embodiments, the information transmitted at 104 may be transmitted in a message associated with an NGAP setup procedure (e.g., a NG setup response), a X1 application protocol (X1AP) setup procedure (e.g., a X1 setup response), a F1 application protocol (F1AP) setup procedure (e.g., a F1 setup response), an E1 application protocol (E1AP) setup procedure (e.g., an E1 setup response), a downlink NAS transport procedure (e.g., a downlink NAS transport message), or a handover procedure over an NG, Xn, F1, E1, and/or the like interface. Additionally, or alternatively, the information transmitted at 104 may include NSSAI, e.g., an IMS emergency call S-NSSAI included in a slice support item information element (IE) and/or in an allowed S-NSSAI list IE. These and other aspects are described in more detail elsewhere herein. In certain embodiments, the RAN node and/or the network node may use the at least one network slice for the emergency operations (e.g., for an IMS emergency call).

As described above, FIG. 1 is provided as an example. Other examples are possible, according to some embodiments.

Figure 2:
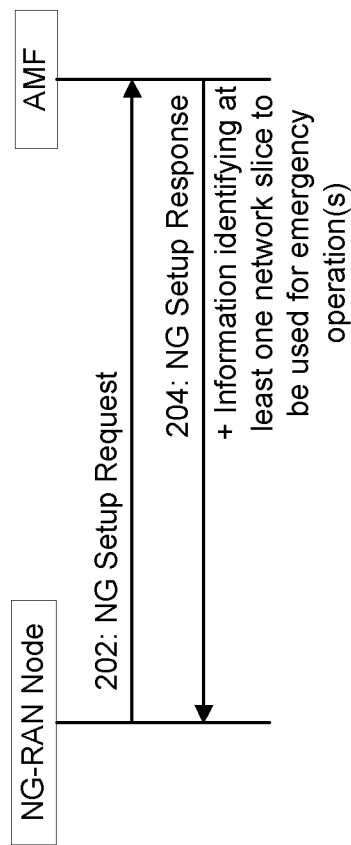
FIG. 2 illustrates an example signal diagram for NG setup, according to some embodiments.

FIG. 2 illustrates an example signal diagram 200 for NG setup, according to some embodiments. As illustrated in FIG. 2, the signal diagram 200 includes an NG-RAN node and an AMF. In certain embodiments, the procedure illustrated in FIG. 2 may be initiated by the NG-RAN node and/or the AMF.

As illustrated at 202, the NG-RAN node may transmit, and the AMF may receive, an NG setup request. For example, the NG-RAN node may include, in the NG setup request, information identifying its supported network slices. The NG setup request may further include an extended TAI slice support list. Table 1 provides an example of the information that may be included in NG setup request at 202 (e.g., IEs and/or Group Names) and other associated information.

TABLE 1

| IE/Group Name | Presence | Range | Semantics Description | Criticality | Assigned Criticality |
|---|---|---|---|---|---|
| Supported TA List | | 1 | Supported TAs in the NG-RAN node. | YES | Reject |
| >Supported TA Item | | 1..max number of TACs (<maxnoofTACs>) | — | | |
| >>Tracking Area Code (TAC) | Mandatory (M) | | Broadcast TAC | — | |
| >>Broadcast PLMN List | | 1 | | — | |
| >>>Broadcast PLMN Item | | 1..max number of background PLMNs (<maxnoofBPLMNs>) | | — | |
| >>>>PLMN Identity | M | | Broadcast PLMN | — | |
| >>>>TAI Slice Support List | M | | Supported S-NSSAIs for the per TAC per PLMN or per stand-alone non-public network (SNPN). | — | |
| >>>>Extended TAI Slice Support List | Optional (O) | | Additional Supported S-NSSAIs per TA. | YES | Reject |

As illustrated at 204, the AMF may transmit, and the NG-RAN node may receive, a NG setup response that includes information identifying at least one network slice to be used for emergency operation(s). For example, the AMF may indicate, to the NG-RAN node, a network slice to be used for an IMS emergency call. In certain embodiments, more than one S-NSSAI may be used for an emergency call. Table 2 provides an example of the information that may be included in NG setup response at 204 (e.g., IEs and/or Group Names) and associated information.

TABLE 2

| IE/Group Name | Presence | Range | Semantics description |
|---|---|---|---|
| Slice Support Item | | 1..<maxno-ofSliceItems> | |
| >S-NSSAI | M | | |
| IMS emergency call S-NSSAI | O | 1 | |

In this way, in certain embodiments, the network slice used for an IMS emergency call may be explicitly indicated in NGAP, XNAP, F1AP, E1AP, and/or the like setup and configuration update procedures. This can be performed by providing the emergency call indication to the network slice (e.g., a S-NSSAI), and related PLMN and TA information. The network slice to be used for an IMS emergency call may be exchanged or indicated among core network nodes, in certain embodiments.

As indicated above, FIG. 2 is provided as an example. Other examples are possible, according to some embodiments.

Figure 3:
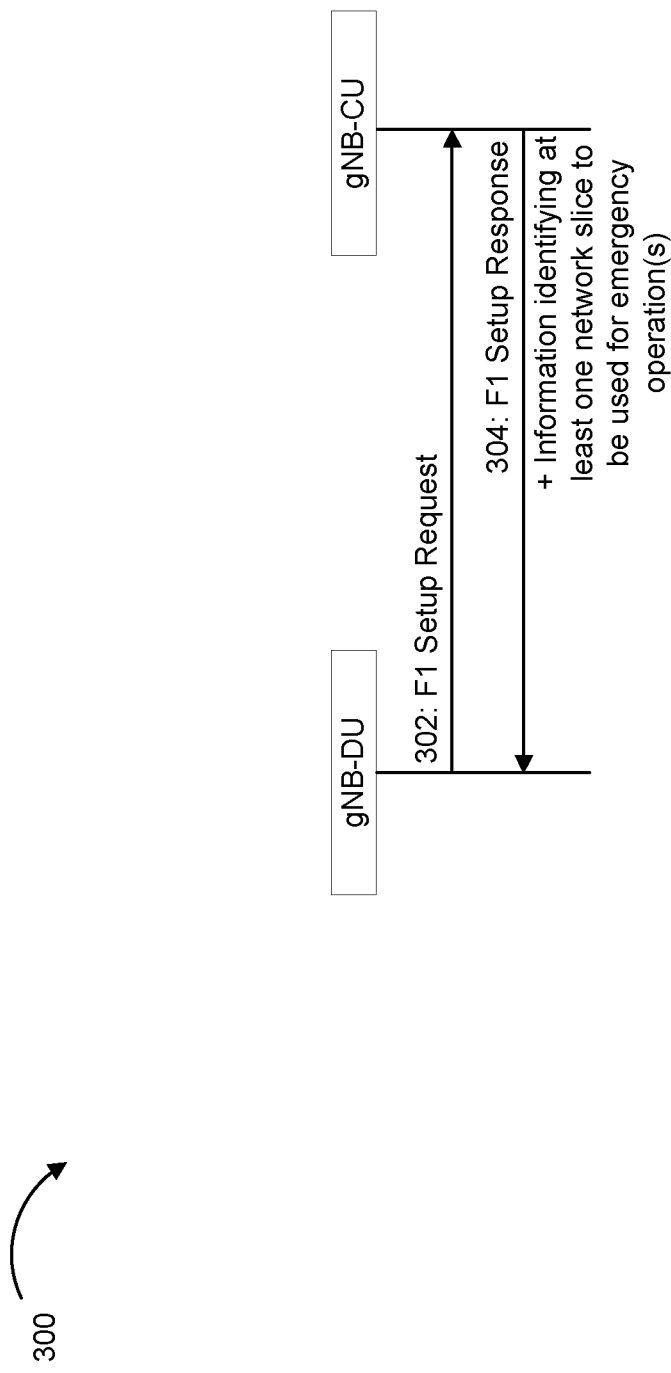
FIG. 3 illustrates an example signal diagram for F1 setup, according to some embodiments.

FIG. 3 illustrates an example signal diagram 300 for F1 setup, according to some embodiments. As illustrated in FIG. 3, the example signal diagram 300 includes a gNB-DU and a gNB-CU.

As illustrated at 302, the gNB-DU may transmit, and the gNB-CU may receive, a F1 setup request. For example, the F1 setup request may include information identifying network slice(s) that the gNB-DU may support, similar to that described elsewhere herein. As illustrated at 304, the gNB-CU may transmit, and the gNB-DU may receive, an F1 setup response that includes information identifying at least one network slice to be used for emergency operation(s). The information that the gNB-CU may transmit to the gNB-DU may be similar to that described elsewhere herein.

As described above, FIG. 3 is provided as an example. Other examples are possible, according to some embodiments.

Figure 4:
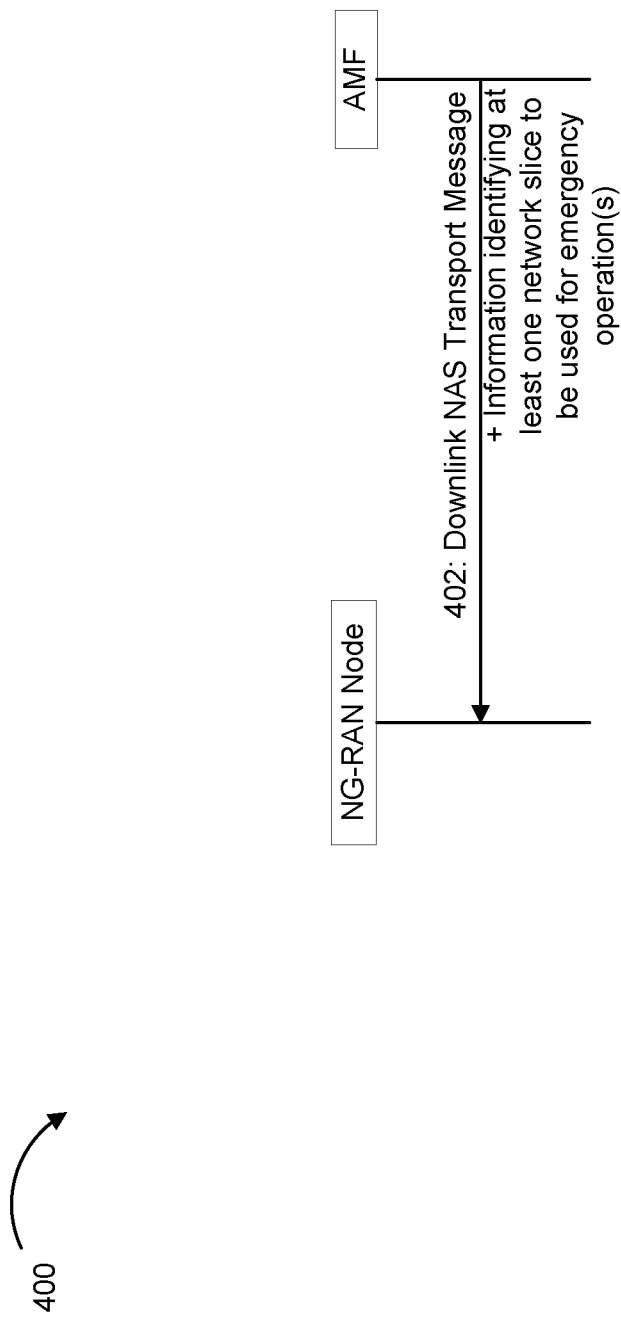
FIG. 4 illustrates an example signal diagram for downlink non-access stratum (NAS) transport, according to some embodiments.

FIG. 4 illustrates an example signal diagram 400 for downlink NAS transport, according to some embodiments. As illustrated in FIG. 4, the signal diagram 400 may include a NG-RAN node and an AMF. As illustrated at 402, the AMF may transmit, and the NG-RAN node may receive, a downlink NAS transport message. In certain embodiments, the message may be related to a UE context setup procedure, a handover procedure, and/or the like over an NG, Xn, F1, E1, and/or the like interface. The downlink NAS transport message may include information identifying at least one network slice to be used for emergency operation(s). For example, the IMS emergency call network slice can be indicated, e.g., with an IE in the downlink NAS transport message. If the information identifying the network slice(s) to be used for emergency operation(s) is included in a NG setup response, per-UE information in the NAS transport message may not be needed unless there is more than one IMS emergency call and not all UEs can use the network slices, even when included in the UE's allowed S-NSSAI. This may be the case if there are organization-specific IMS emergency call network slices, for example. More than one S-NSSAI for IMS emergency services may be used. Table 3 provides an example of the information that the AMF may transmit to the NG-RAN node at 402 (e.g., IEs and/or Group Names) and associated information.

TABLE 3

| IE/Group Name | Presence | Range | Semantics description |
|---|---|---|---|
| Allowed S-NSSAI List | | 1 | |
| >Allowed S-NSSAI Item | | 1..max number of allowed S-NSSAIs (<maxno-ofAllowedS-NSSAIs>) | |
| >>S-NSSAI | M | | |
| IMS Emergency call S-NSSAI | O | 1 | |

In certain embodiments, the NG-RAN node may transmit, and the AMF may receive, information that identifies network slice(s) supported by the NG-RAN node prior to the message transmission at 402. For example, the information may include allowed NSSAI (e.g., a set of S-NSSAIs). Table 4 provides an example of this information (e.g., IEs and/or Group Names) and associated information.

TABLE 4

| IE/Group Name | Presence | Range | Semantics Description | Criticality | Assigned Criticality |
|---|---|---|---|---|---|
| Allowed NSSAI | O | | | Yes | Reject |

As described above, FIG. 4 is provided as an example. Other examples are possible, according to some embodiments.

In certain embodiments, information that identifies the network slice(s) to be used for emergency operations may be exchanged between core networks. For example, this exchange of information between core networks may occur in an inter-PLMN scenario and/or a shared network scenario (e.g., either a shared RAN or a multi-operator core network (MCON) scenario).

In certain embodiments, the information that identifies the network slice(s) to be used for emergency operations may be exchanged between core network nodes (e.g., AMFs). For example, in a UE registration procedure, the information may be exchanged between a new AMF and an old AMF in a UE context transfer message and/or in a UE context transfer response. The information may also be exchanged between AMFs in a non-UE-specific message procedure. In certain embodiments, an AMF may indicate the network slice(s) to be used for emergency operations in a create session management context request sent to a session management function (SMF) in a protocol data unit (PDU) session establishment procedure. Additionally, or alternatively, in the PDU session establishment procedure, the SMF and a unified data management (UDM) node may exchange the information that identifies the network slice(s) to be used for emergency operations.

In certain embodiments, the information that identifies the network slice(s) to be used for emergency operations may be included in UE-related information stored by the AMF (e.g., in the UE context in the AMF). For example, the information may be included in S-NSSAI or a network slice instance identifier related to an active PDU session, or may be separate from the S-NSSAI and the network slice instance identifier.

In certain embodiments, the information identifying the network slice(s) to be used for emergency operations may be provided on a per-UE basis in UE-related signaling, e.g., instead of, or in addition to, providing the information identifying the network slice(s) in an interface setup message, such as in the NGAP setup procedure. For example, the UE-related signaling may include use of NGAP from the AMF to the RAN. In certain embodiments, the information identifying the network slice(s) may be exchanged during a UE registration phase, e.g., in NGAP downlink NAS transport. For example, the information may be included in a message, such as a downlink NAS transport message, that the core network sends towards a RAN when the UE registers and/or establishes a UE context in the RAN (e.g., the information may be included in a list of allowed NSSAIs). Additionally, or alternatively, other messages can be used for providing the UE's allowed S-NSSAI and/or network slice identifiers. In certain embodiments, the information identifying the network slice(s) to be used may be exchanged at PDU session establishment and/or during a radio resource reservation procedure in a RAN, e.g., in a PDU session resource setup request indicating the network slice(s) associated with the PDU session. For example, the information identifying the network slice(s) to be used may be included in a PDU session resource setup request, such as in a list of S-NSSAIs. Additionally, or alternatively, other messages containing the same information such as NGAP initial UE context setup request may be used.

Figure 5:
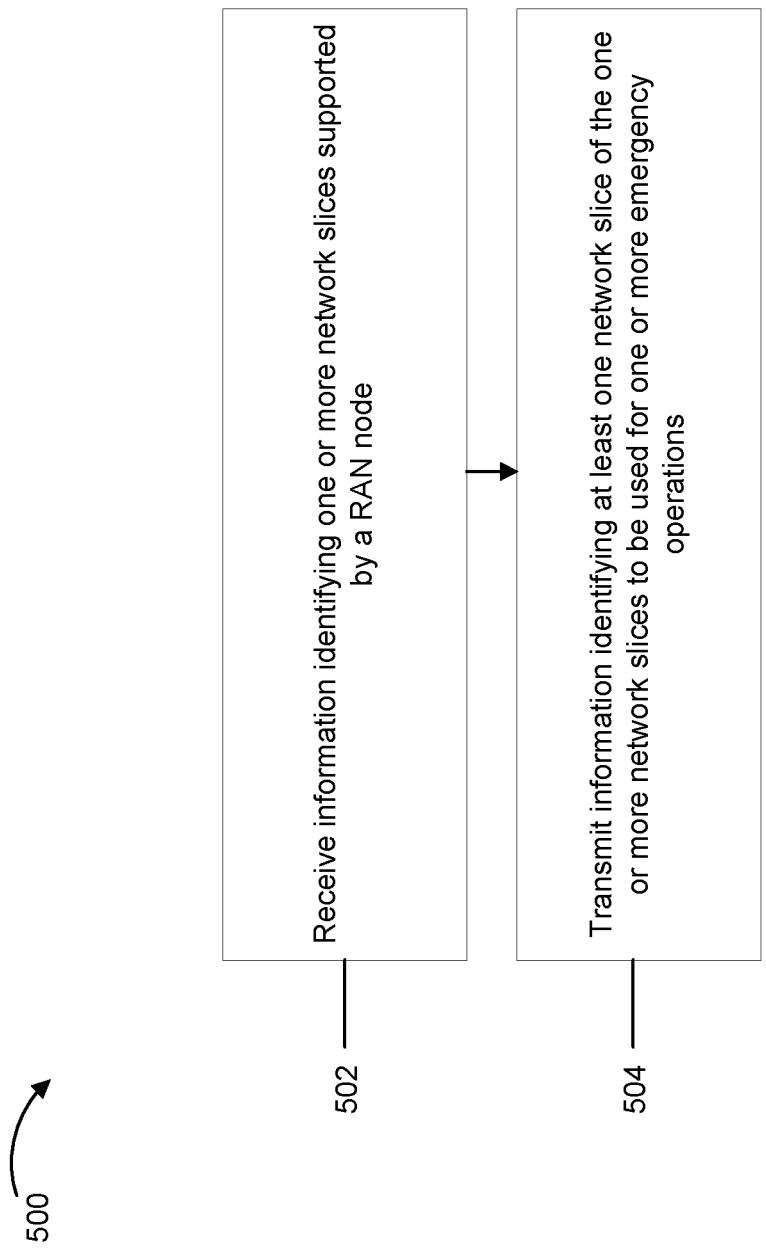
FIG. 5 illustrates an example flow diagram of a method, according to some embodiments.

FIG. 5 illustrates an example flow diagram of a method 500, according to some embodiments. For example, FIG. 5 may illustrate example operations of a network node (e.g., apparatus 10 illustrated in, and described with respect to, FIG. 7a). In particular, FIG. 5 may illustrate example operations of an AMF, an O&M node, an OAM node, or a RAN node. Some of the operations illustrated in FIG. 5 may be similar to some operations shown in, and described with respect to, FIGS. 1-4.

In an embodiment, the method 500 may include, at 502, receiving information identifying one or more network slices supported by a radio access network node, e.g., in a manner similar to that at 102 of FIG. 1, 202 of FIG. 2, and/or 302 of FIG. 3. The method 500 may include, at 504, transmitting information identifying at least one network slice of the one or more network slices to be used for one or more emergency operations, e.g., in a manner similar to that at 104 of FIG. 1, 204 of FIG. 2, 304 of FIG. 3, and/or 402 of FIG. 4.

The method 500 illustrated in FIG. 5 may include one or more additional aspects described below or elsewhere herein. In some embodiments, the transmitting at 504 may include transmitting the information in at least one of a NG setup response (e.g., as at 204 of FIG. 2), a F1 setup response (e.g., as at 304 of FIG. 3), a downlink NAS transport message (e.g., as at 402 of FIG. 4), an E1 setup response, a Xn setup response, or user equipment-related signaling. In some embodiments, the transmitting at 504 may include transmitting the information to a RAN node that includes at least one of a network node (e.g., a gNB), a central unit of the network node (e.g., a gNB CU), a control plane of the central plane of the network node (e.g., a gNB CU-CP), a user plane of the central unit of the network node (e.g., a gNB CU-UP), or a distributed unit of the network node (e.g., a gNB DU), or transmitting the information to a core network node. In some embodiments, the transmitting at 504 may include transmitting the information in a message associated with at least one of a NGAP setup procedure, a X1AP setup procedure, a F1AP setup procedure, an E1AP setup procedure, a downlink NAS transport procedure, a handover procedure over an interface (e.g., a NG interface, an Xn interface, a F1 interface, or an E1 interface), or a user equipment-related procedure.

In some embodiments, the information transmitted at 504 may include NSSAI or a network slice instance identifier. In some embodiments, the one or more emergency operations may include at least an emergency call. In some embodiments, the method 500 may further include transmitting, in association with transmitting the information at 504, PLMN information or TA information.

As described above, FIG. 5 is provided as an example. Other examples are possible according to some embodiments.

Figure 6:
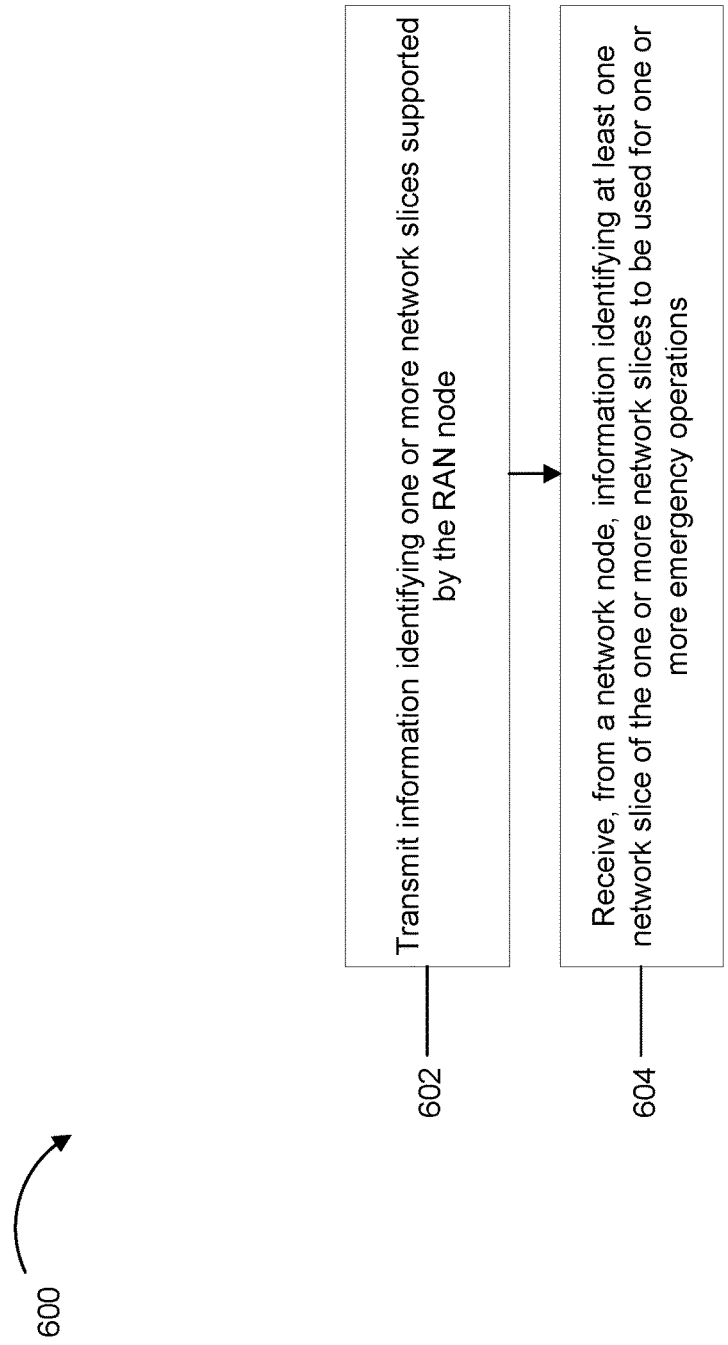
FIG. 6 illustrates an example flow diagram of a method, according to some embodiments.

FIG. 6 illustrates an example flow diagram of a method 600, according to some embodiments. For example, FIG. 6 may illustrate example operations of a RAN node or a core network node (e.g., apparatus 10 illustrated in, and described with respect to, FIG. 7a). In particular, FIG. 6 may illustrate example operations of a gNB, a gNB CU, a gNB CU-UP, a gNB CU-CP, a gNB DU, and/or an AMF. Some of the operations illustrated in FIG. 6 may be similar to some operations shown in, and described with respect to, FIGS. 1-4.

In an embodiment, the method 600 may include, at 602, transmitting information identifying one or more network slices supported by the RAN node, e.g., in a manner similar to that at 102 of FIG. 1, 202 of FIG. 2, and 302 of FIG. 3. The method 600 may include, at 604, receiving, from a network node, information identifying at least one network slice of the one or more network slices to be used for one or more emergency operations, e.g., in a manner similar to that at 104 of FIG. 1, 204 of FIG. 2, 304 of FIG. 3, and 402 of FIG. 4.

The method 600 illustrated in FIG. 6 may include one or more additional aspects described below or elsewhere herein. In some embodiments, the receiving at 604 may include receiving the information in at least one of a NG setup response (e.g., as at 204 of FIG. 2), a F1 setup response (e.g., as at 304 of FIG. 3), a downlink NAS transport message (e.g., as at 402 of FIG. 4), an E1 setup response, a Xn setup response, or user equipment-related signaling. In some embodiments, the RAN node may include at least one of a network node (e.g., a gNB), a central unit of the network node (e.g., a gNB CU), a control plane of the central plane of the network node (e.g., a gNB CU-CP), a user plane of the central unit of the network node (e.g., a gNB CU-UP), a distributed unit of the network node (e.g., a gNB DU), or a core network node. In some embodiments, the receiving at 504 may include receiving the information in a message associated with at least one of a NGAP setup procedure, a X1AP setup procedure, a F1AP setup procedure, an E1AP setup procedure, a downlink NAS transport procedure, a handover procedure over an interface (e.g., a NG interface, an Xn interface, a F1 interface, or an E1 interface), or a user equipment-related procedure.

In some embodiments, the information received at 604 may include NSSAI or a network slice instance identifier. In some embodiments, the one or more emergency operations may include at least an emergency call. In some embodiments, the method 600 may further include receiving, in association with receiving the information at 604, PLMN information or TA information.

As described above, FIG. 6 is provided as an example. Other examples are possible according to some embodiments.

Figure 7B:
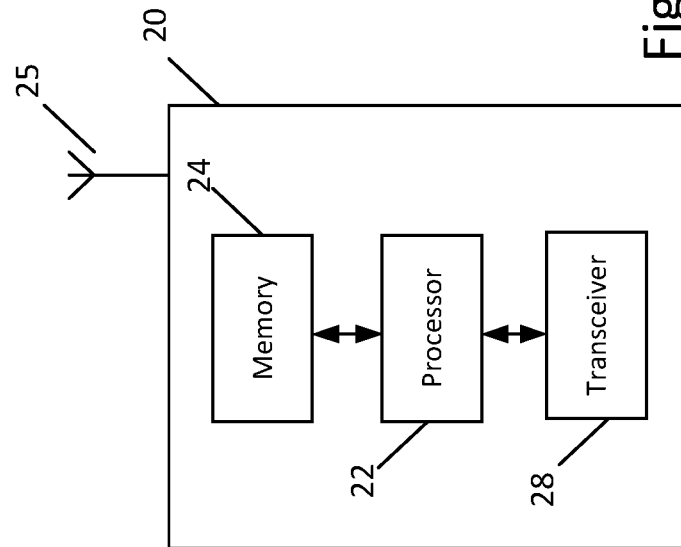
FIG. 7b illustrates an example block diagram of an apparatus, according to another embodiment.
Figure 7A:
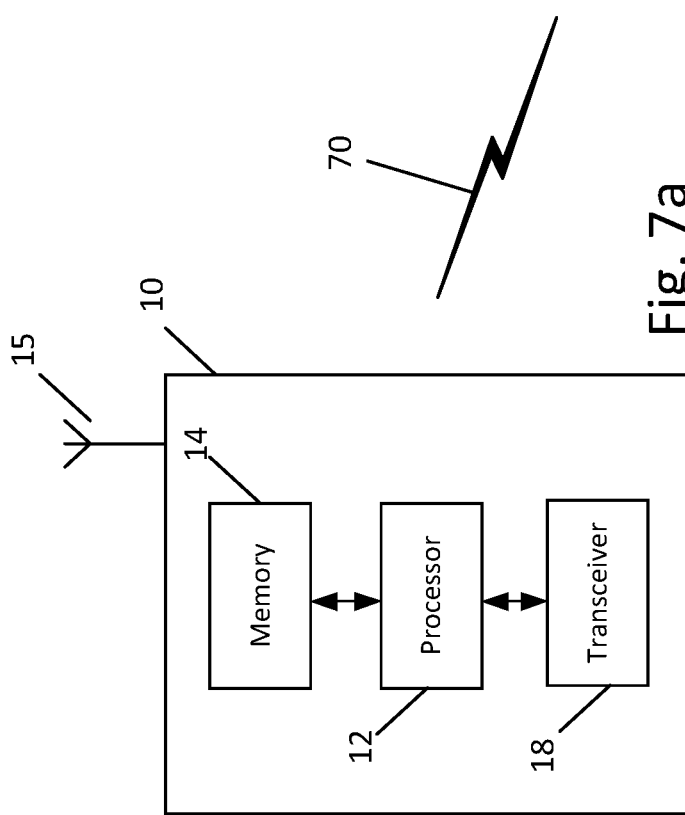
FIG. 7a illustrates an example block diagram of an apparatus, according to an embodiment.

FIG. 7a illustrates an example of an apparatus 10 according to an embodiment. In an embodiment, apparatus 10 may be a node, host, or server in a communications network or serving such a network. For example, apparatus 10 may be a network node, RAN node, AMF, OAM node, O&M node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7a.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-6. For instance, apparatus 10 may be controlled by memory 14 and processor 12 to perform the methods of FIG. 5 or 6.

FIG. 7b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein.

In some embodiments, an apparatus (e.g., apparatus 10 and/or apparatus 20) may include means for performing a method or any of the variants discussed herein, e.g., a method described with reference to FIG. 5 or 6. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is a reduction or elimination of errors due to mismatch between a network slice to be used for emergency operations and network slices supported by a RAN node. Accordingly, the use of some example embodiments results in improved functioning of communications networks and their nodes and, therefore constitute an improvement at least to the technological field of network slice-based emergency operations, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

AMF Access and Mobility Management Function
IMS Internet Protocol Multimedia Subsystem
NSSAI Network Slice Selection Assistance Information
O&M Operational and Maintenance
OAM Operations, Administration, and Maintenance
PLMN Public Land Mobile Network
RAN Radio Access Network
TA Tracking Area

I claim:
1. An apparatus, comprising:
at least one processor; and
at least one memory including computer program code, wherein the at least one memory and the computer program code are configured to, with the at least one processor, cause the apparatus at least to:
include, in a slice support list or allowed list comprising a list of network slices supported or allowed by the apparatus, an information element comprising at least one single network slice selection assistant information (S-NSSAI) identifying at least one network slice configured to be used for one or more emergency operations; and
transmit information comprising the slice support list or allowed list.

2. The apparatus according to claim 1, wherein the at least one memory and the computer program code are configured to, with the at least one processor, further cause the apparatus, when transmitting the information, at least to:
transmit the information in at least one of:
a next generation setup response,
a downlink non-access stratum transport message,
a F1 setup response,
an E1 setup response,
a Xn setup response, or
a user equipment-related signaling.

3. The apparatus according to claim 1, wherein the at least one memory and the computer program code are configured to, with the at least one processor, further cause the apparatus, when transmitting the information, at least to:
transmit the information to a core network; or
transmit the information to a radio access network node, wherein the radio access network node comprises at least one of:
a network node,
a central unit of the network node,
a control plane of the central unit of the network node,
a user plane of the central unit of the network node, or
a distributed unit of the network node.

4. The apparatus according to claim 1, wherein the at least one memory and the computer program code are configured to, with the at least one processor, further cause the apparatus, when transmitting the information, at least to:
transmit the information in a message associated with at least one of:
a next generation application protocol setup procedure,
a X1 application protocol setup procedure,
a F1 application protocol setup procedure,
an E1 application protocol setup procedure,
a downlink non-access stratum transport procedure,
a handover procedure over an interface, or
a user equipment-related procedure.

5. The apparatus according to claim 1, wherein the information comprises network slice selection assistance information or a network slice instance identifier.

6. The apparatus according to claim 1, wherein the one or more emergency operations comprise at least an emergency call.

7. The apparatus according to claim 1, wherein the at least one memory and the computer program code are configured to, with the at least one processor, further cause the apparatus at least to:
transmit, in association with transmitting the information, public land mobile network information or tracking area information.

8. The apparatus according to claim 1, wherein the at least one memory and the computer program code are configured to, with the at least one processor, further cause the apparatus at least to:
receive information identifying one or more network slices supported by a radio access network node prior to transmitting the information, wherein the at least one network slice configured to be used for one or more emergency operations is included in the one or more network slices.

9. An apparatus, comprising:
at least one processor; and
at least one memory including computer program code,
wherein the at least one memory and the computer program code are configured to, with the at least one processor, cause the apparatus at least to:
receive, from a network node, information comprising a slice support list or allowed list comprising a list of network slices supported or allowed by the apparatus, wherein the slice support list or allowed list comprises an information element comprising at least one single network slice selection assistant information (S-NSSAI) identifying at least one network slice configured to be used for one or more emergency operations.

10. The apparatus according to claim 9, wherein the at least one memory and the computer program code are configured to, with the at least one processor, further cause the apparatus, when receiving the information, at least to:
receive the information in at least one of:
a next generation setup response,
a downlink non-access stratum transport message,
a F1 setup response,
an E1 setup response,
a Xn setup response, or
a user equipment-related signaling.

11. The apparatus according to claim 9, wherein the apparatus comprises at least one of:
a network node,
a central unit of the network node,
a control plane of the central unit of the network node,
a user plane of the central unit of the network node,
a distributed unit of the network node, or
a core network node.

12. The apparatus according to claim 9, wherein the at least one memory and the computer program code are configured to, with the at least one processor, further cause the apparatus, when receiving the information, at least to:
receive the information in a message associated with at least one of:
a next generation application protocol setup procedure,
a X1 application protocol setup procedure,
a F1 application protocol setup procedure,
an E1 application protocol setup procedure,
a downlink non-access stratum transport procedure,
a handover procedure over an interface, or
a user equipment-related procedure.

13. The apparatus according to claim 9, wherein the information comprises network slice selection assistance information or a network slice instance identifier.

14. The apparatus according to claim 9, wherein the one or more emergency operations comprise at least an emergency call.

15. The apparatus according to claim 9, wherein the at least one memory and the computer program code are configured to, with the at least one processor, further cause the apparatus at least to:
receive, in association with receiving the information, public land mobile network information or tracking area information.

16. The apparatus according to claim 9, wherein the at least one memory and the computer program code are configured to, with the at least one processor, further cause the apparatus at least to:

transmit information identifying one or more network slices supported by the apparatus prior to receiving the information, wherein the at least one network slice configured to be used for one or more emergency operations is included in the one or more network slices.

17. A method, comprising:

including in a slice support list or allowed list comprising a list of network slices supported or allowed by an apparatus, an information element comprising at least one single network slice selection assistant information (S-NSSAI) identifying at least one network slice configured to be used for one or more emergency operations; and transmitting information comprising the slice support list or allowed list.

18. The method according to claim 17, wherein the transmitting comprises transmitting the information in at least one of:

a next generation setup response,
    a downlink non-access stratum transport message,
    a F1 setup response,
    an E1 setup response,
    a Xn setup response, or
    a user equipment-related signaling.

19. The method according to claim 17, wherein the transmitting of the information further comprises:

transmitting the information to a core network node; or
    transmitting the information to a radio access network node, wherein the radio access network node comprises at least one of:
    a network node,
    a central unit of the network node,
    a control plane of the central unit of the network node,
    a user plane of the central unit of the network node, or
    a distributed unit of the network node.

20. The method according to claim 17, wherein the transmitting of the information further comprises transmitting the information in a message associated with at least one of:

a next generation application protocol setup procedure,
    a X1 application protocol setup procedure,
    a F1 application protocol setup procedure,
    an E1 application protocol setup procedure,
    a downlink non-access stratum transport procedure,
    a handover procedure over an interface, or
    a user equipment-related procedure.

* * * * *